(12) United States Patent
Totsuka (10) Patent No.: US 11,546,482 B2
(45) Date of Patent: Jan. 3, 2023

(54) DOCUMENT READING APPARATUS, CONTROL METHOD THEREOF, AND STORAGE MEDIUM

(71) Applicant: CANON KABUSHIKI KAISHA, Tokyo (JP)

(72) Inventor: Satoshi Totsuka, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/375,922

(22) Filed: Jul. 14, 2021

(65) Prior Publication Data
US 2022/0021777 A1    Jan. 20, 2022

(30) Foreign Application Priority Data
Jul. 17, 2020 (JP) .............................. JP2020-123123

(51) Int. Cl.
*H04N 1/00* (2006.01)
*B65H 7/20* (2006.01)

(52) U.S. Cl.
CPC .......... *H04N 1/00708* (2013.01); *B65H 7/20* (2013.01); *H04N 1/00602* (2013.01); *H04N 1/00748* (2013.01); *B65H 2301/13* (2013.01); *B65H 2511/12* (2013.01); *B65H 2511/414* (2013.01)

(58) Field of Classification Search
CPC .......... H04N 1/00013; H04N 1/00018; H04N 1/00092; H04N 1/00519–00679; H04N 1/00681–00761; H04N 1/00785–00827; H04N 1/00835; H04N 1/00909; H04N 1/024–0318; H04N 1/04–207; H04N 2201/024–04798

USPC .......................................... 358/474, 498, 497
See application file for complete search history.

(56) References Cited

U.S. PATENT DOCUMENTS

| | | | | |
|---|---|---|---|---|
| 8,411,336 | B2 * | 4/2013 | Ishikawa | H04N 1/2032 358/514 |
| 8,446,645 | B2 * | 5/2013 | Okada | H04N 1/3263 358/496 |
| 8,610,907 | B2 * | 12/2013 | You | H04N 1/0035 358/1.18 |
| 10,310,789 | B2 * | 6/2019 | Tsuji | H04N 1/00795 |
| 10,965,827 | B2 * | 3/2021 | Seto | H04N 1/3263 |
| 11,095,789 | B2 * | 8/2021 | Nishiyama | H04N 1/00779 |
| 2018/0160008 | A1 * | 6/2018 | Osada | H04N 1/00708 |

(Continued)

FOREIGN PATENT DOCUMENTS

JP    2001-350225 A    12/2001

*Primary Examiner* — Negussie Worku
(74) *Attorney, Agent, or Firm* — Canon U.S.A., Inc. I.P. Division (57) ABSTRACT

A document reading apparatus having a display unit and a placement section on which plural documents is to be placed includes a conveyance unit and a reading unit. The conveyance unit conveys a document placed on the placement section. The reading unit reads a document conveyed by the conveyance unit and generates image data. Based on at least a reading mode being set on the document reading apparatus of reading a plurality of documents of a plurality of different sizes in a single job by the reading unit, first prompting information that prompts placement of the plurality of documents at a center of the placement section in a direction perpendicular to a document conveyance direction in which the conveyance unit conveys the plurality of documents is displayed on the display unit.

8 Claims, 9 Drawing Sheets

(56) References Cited

U.S. PATENT DOCUMENTS

| | | | |
|---|---|---|---|
| 2018/0373480 A1* | 12/2018 | Tsuji | H04N 1/00798 |
| 2020/0076975 A1* | 3/2020 | Nishiyama | H04N 1/00779 |
| 2020/0322494 A1* | 10/2020 | Seto | H04N 1/3263 |
| 2021/0112171 A1* | 4/2021 | Tachibana | B65H 3/0684 |
| 2021/0281695 A1* | 9/2021 | Seto | H04N 1/32713 |
| 2022/0024708 A1* | 1/2022 | Hirao | B65H 3/0684 |
| 2022/0086298 A1* | 3/2022 | Hirao | B65H 7/20 |

* cited by examiner

DOCUMENT READING APPARATUS, CONTROL METHOD THEREOF, AND STORAGE MEDIUM

BACKGROUND

Field

The present disclosure relates to a document reading apparatus, a control method thereof, and a storage medium.

Description of the Related Art

There is a document reading apparatus that operates in a mixed document reading mode (refer to Japanese Patent Application Laid-Open No. 2001-350225). In the mixed document reading mode, each of a plurality of documents of different sizes that is placed on a document tray is singly conveyed, and the document reading apparatus determines the size of each conveyed document and reads the document in the determined size.

In a case where a user sets the mixed document reading mode, the user places a plurality of documents of different sizes on the document tray.

In a case where a plurality of documents of different sizes is placed, the width between guide portions on the document tray is adjusted based on the largest one of the plurality of documents of different sizes. Thus, there is a possibility that a document having a width smaller in a direction perpendicular to a document conveyance direction than that of the largest document is placed on the document tray by abutting the document against one of the guide portions on the document tray. In this case, the following issue arises.

For example, depending on the width of the document in the direction perpendicular to the document conveyance direction, the document may touch the documents placed on the document tray and may fail to reach a roller for conveying the documents. As a result, the document is not conveyed.

SUMMARY

The present disclosure is directed to a technique for preventing a failure to convey a document due to a placement position of the document in a case where a plurality of documents of a plurality of different sizes is placed.

According to an aspect of the present disclosure, a document reading apparatus having a display unit and a placement section on which plural documents is to be placed includes a conveyance unit configured to convey a document placed on the placement section, and a reading unit configured to read a document conveyed by the conveyance unit and to generate image data, wherein, based on at least a reading mode being set on the document reading apparatus of reading a plurality of documents of a plurality of different sizes in a single job by the reading unit, first prompting information that prompts placement of the plurality of documents at a center of the placement section in a direction perpendicular to a document conveyance direction in which the conveyance unit conveys the plurality of documents is displayed on the display unit.

Further features of the present disclosure will become apparent from the following description of exemplary embodiments with reference to the attached drawings.

DESCRIPTION OF THE EMBODIMENTS

Various exemplary embodiments of the present disclosure will be described below with reference to the drawings. Each configuration described in the exemplary embodiments is a mere example, and the present disclosure is not limited to the configurations.

Figure 3:
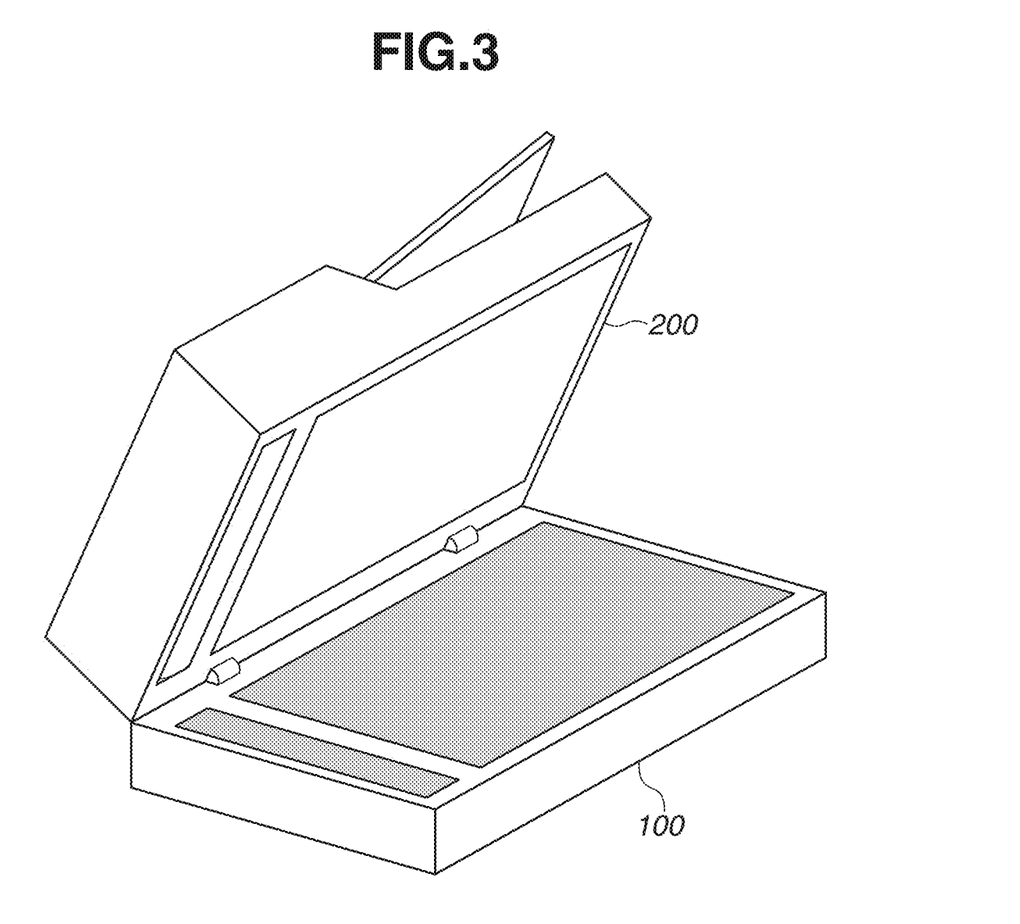
FIG. 3 is a perspective view illustrating an example of an automatic document reading unit according to an exemplary embodiment.

An example of a configuration of an automatic document reading unit according to an exemplary embodiment of the present disclosure will be described below with reference to the drawings. FIG. 3 is a perspective view illustrating an example of the automatic document reading unit according to the present exemplary embodiment. The automatic document reading unit according to the present exemplary embodiment includes a document reading unit 100 and an automatic document conveyance apparatus (automatic document feeder (ADF)) 200. The document reading unit 100 reads a document, and the ADF 200 conveys the document to the document reading unit 100. The ADF 200 is connected to the document reading unit 100 with an opening/closing hinge at the back of an upper surface of the document reading unit 100 so that the ADF 200 is freely openable and closable.

<Example of Configuration of Document Reading Unit 100>

Figure 4:
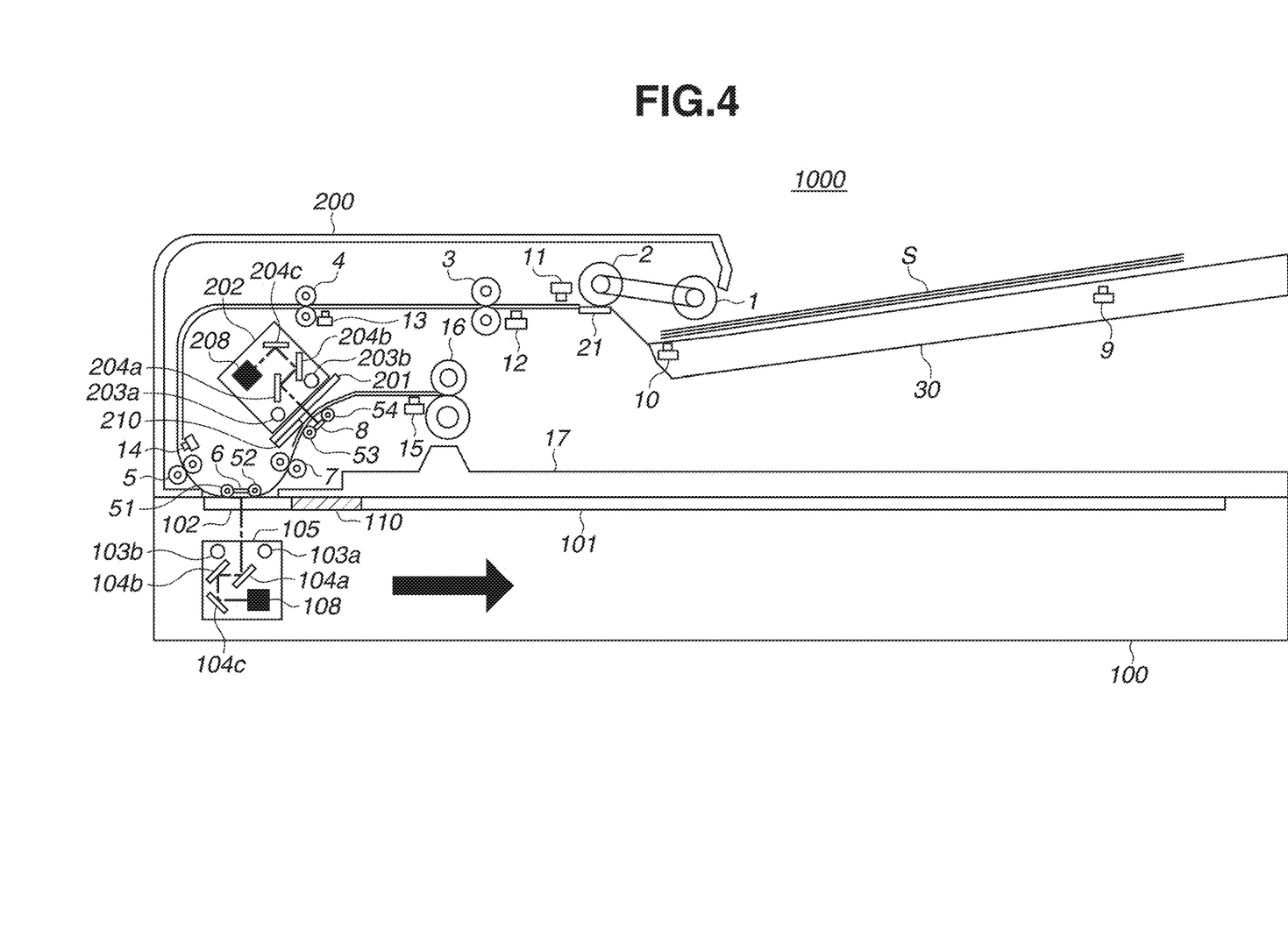
FIG. 4 is a cross-sectional view illustrating an automatic document reading unit according to a first exemplary embodiment.

The document reading unit 100 will be described below with reference to FIG. 4. FIG. 4 is a diagram illustrating an example of a cross section of the ADF 200 and the document reading unit 100 according to the present exemplary embodiment.

The document reading unit 100 includes a platen glass 101, a front surface reading unit 105, an optical motor 306 (not illustrated), and a reading movement guide 109. In controlling document reading, the document reading unit 100 reads a document placed on the platen glass 101. Specifically, while moving the front surface reading unit 105 along the reading movement guide 109 using the optical motor 306, the document reading unit 100 reads a front surface of the document placed on the platen glass 101 by reading one line at a time to read an image on the front surface. Further, in controlling flow-reading, an image of a document conveyed to a front surface flow-reading glass 102 by the ADF 200 is read by the front surface reading unit 105.

<Example of Configuration of Automatic Document Conveyance Apparatus (ADF) 200>

The ADF 200 will be described below with reference to FIG. 4. The ADF 200 includes a document tray 30, a separation pad 21, a separation roller 2, and a sheet feeding roller 1. The document tray 30 is a placement section on which a document set S including one or more documents is placed. The separation pad 21 and the separation roller 2 are a separation mechanism that regulates the downstream movement of the document set S beyond the document tray 30. Further, the document tray 30 includes a document presence/absence detection sensor 10 and a length-on-tray sensor 9. The document presence/absence detection sensor 10 detects the presence/absence of a document. The length-on-tray sensor 9 determines a size on the document tray 30.

The sheet feeding roller 1 is situated in the vicinity of a center of the document tray 30 in a direction perpendicular to a document conveyance direction in which the documents are conveyed. A specific position is a 10-cm range in the direction perpendicular to the document conveyance direction from a point at the same distance from both of guide portions a and b in a maximally extended state. This position will be referred to as a substantial center.

Figure 2:
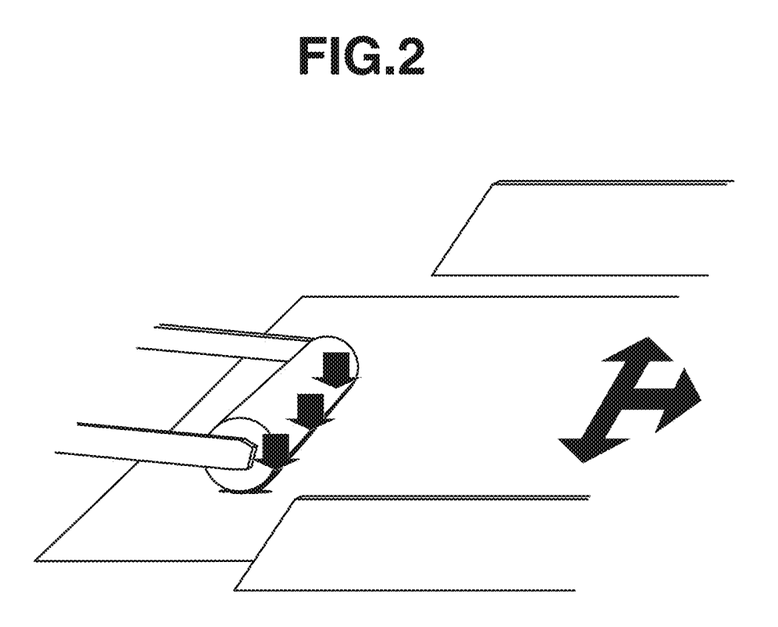
FIG. 2 is a diagram illustrating an example of a sheet feeding roller for conveying documents.

During document reading and conveyance, in order to ensure that the document placed on the document tray 30 is conveyed, the sheet feeding roller 1 and the document set S placed on the document tray 30 are brought into contact with each other to apply a suitable pressure to the contact portion. In order to do so, the document tray 30 is lifted to a predetermined height, and the sheet feeding roller 1 is pressed against the uppermost document of the document set S placed on the document tray 30. In this state, the sheet feeding roller 1 is rotated to convey the uppermost document of the document set S as illustrated in FIG. 2. The separation pad 21 and the separation roller 2 act to separate the uppermost document conveyed by the sheet feeding roller 1 and to convey the separated document. This separation is realized using a publicly-known separation technique.

The document separated by the separation pad 21 and the separation roller 2 is conveyed to a drawing roller 3, and the drawing roller 3 conveys the document to a conveyance roller 4. On the downstream side of the conveyance roller 4, there is a conveyance path along which the document conveyed through the conveyance roller 4 is conveyed to the direction of the front surface flow-reading glass 102. The document conveyed to the conveyance path is conveyed to a front surface reading position by a front surface reading conveyance roller 5 and a front surface reading upstream roller 51.

<Front Surface Reading>

The document conveyed to the front surface reading position is conveyed between the front surface flow-reading glass 102 and a front surface glass facing member 6 and is illuminated by front-surface light-emitting diodes (LEDs) 103a and 103b. Then, while the reflection light is bent by a plurality of mirrors 104a, 104b, and 104c, a front-surface line sensor 108 reads an image on the document by reading one line at a time.

The read document is discharged to a sheet discharge tray 17 by a sheet discharge roller 16 and a conveyance roller 7 between the front surface reading position and a rear surface reading position.

In a case where a plurality of documents is on the document tray 30, the process of feeding a document from the document set S, separating the document, conveying the document, reading one side at the front surface flow-reading position, and discharging the document is repeated until the reading of the front surface of the last document and the discharging of the document to the sheet discharge tray 17 end.

<Two-Sided Reading>

The two-sided flow-reading includes an operation of reading a rear surface of a document in addition to the reading of a front surface of the document in the one-sided flow-reading. The document feeding, the document separation, the document conveyance, and the front surface reading are similar to those in the one-sided reading described above, so that redundant descriptions thereof are omitted.

A document conveyed by a front surface reading downstream roller 52 is conveyed to a rear surface flow-reading position by the conveyance roller 7 for rear surface reading and a rear surface reading upstream roller 53. Before the document reaches the rear surface flow-reading position, a rear surface flow-reading glass 201, which is movable, is moved to a position specified in FIG. 4. The rear surface of the document conveyed between the rear surface flow-reading glass 201 and a rear surface glass facing member 8 is illuminated by rear-surface LEDs 203a and 203b. While the reflection light is bent by a plurality of mirrors 204a, 204b, and 204c, a rear-surface line sensor 208 reads an image on the rear surface of the document (rear surface reading).

The document conveyed by a rear surface reading downstream roller 54 is conveyed to the sheet discharge tray 17 by the sheet discharge roller 16.

In a case where a plurality of documents is on the document tray 30, the process of feeding a document from the document set S, separating the document, conveying the document, reading a front surface at the front surface flow-reading position, reading a rear surface at the rear surface flow-reading position, and discharging the document is repeated until the reading of the front and rear surfaces of the last document and the sheet discharging to the sheet discharge tray 17 end.

The front surface reading unit 105 and a rear surface reading unit 202 can be used not only in a configuration that uses a charge-coupled device (CCD) sensor as illustrated in FIG. 4 but also in a configuration that uses a contact image sensor (CIS).

<Description of Block Diagram>

Figure 5:
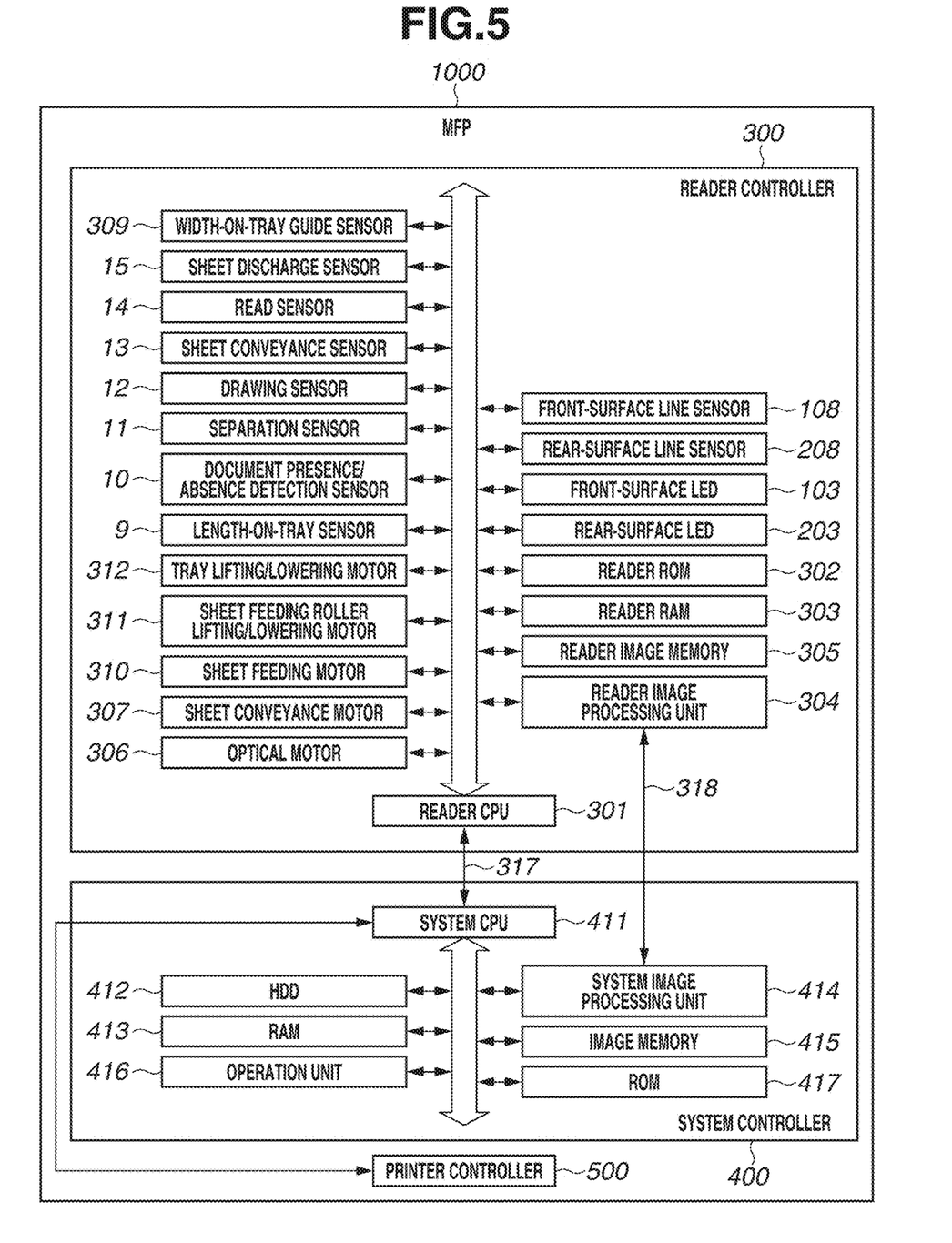
FIG. 5 is a diagram illustrating an example of a cross section of an automatic document conveyance apparatus (automatic document feeder (ADF)) and a document reading unit according to an exemplary embodiment of the present disclosure.

FIG. 5 is a block diagram illustrating a configuration of a multi-function peripheral (MFP) 1000 according to the present exemplary embodiment. The MFP 1000, which is an example of a document reading apparatus, includes a reader controller 300, a system controller 400, and a printer controller 500.

The reader controller 300 includes a reader central processing unit (reader CPU) 301, a reader read-only memory (reader ROM) 302, and a reader random access memory (reader RAM) 303. The reader ROM 302 stores a control program, and the reader RAM 303 stores input data and working data. The reader CPU 301 controls the document reading unit 100 by executing the control program stored in the reader ROM 302 to perform a process illustrated in FIG. 8.

In order to realize a document conveyance function, the reader CPU 301 includes a sheet feeding motor 310 and a sheet conveyance motor 307 for driving rollers for conveyance, and as the sheet feeding motor 310 is driven, the sheet feeding roller 1 and the separation roller 2 coupled with the sheet feeding motor 310 are rotated. The other rollers that are the drawing roller 3, the conveyance roller 4, the front surface reading conveyance roller 5, the conveyance roller 7, and the sheet discharge roller 16 are directly connected to the sheet conveyance motor 307 and are driven and stopped along with the rotation of the sheet conveyance motor 307.

The sheet feeding motor 310 and the sheet conveyance motor 307 according to the present exemplary embodiment are pulse motors, and the reader CPU 301 manages the amount of rotations of each motor by controlling the number of driving pulses. Thus, the number of pulses can be used as a distance by which a document is conveyed during conveyance, and the reader CPU 301 can measure the document conveyance distance by counting the number of driving pulses of the sheet feeding motor 310 and the sheet conveyance motor 307.

Furthermore, conveyance system sensors (including a separation sensor 11, a drawing sensor 12, a sheet conveyance sensor 13, a read sensor 14, and a sheet discharge sensor 15 as illustrated in FIG. 4) provided at places on the conveyance path are connected. Further, the length-on-tray sensor 9 for detecting the length of a document is provided on the document tray 30. Further, there is also a width-on-tray guide sensor 309 for detecting the width of a document, and the size of a document placed on the document tray 30 is predicted using the length-on-tray sensor 9 and the width-on-tray guide sensor 309.

When a document is placed on the document tray 30, the reader CPU 301 operates a sheet feeding roller lifting/lowering motor 311 connected to a sheet feeding roller lifting/lowering mechanism (not illustrated) to lower the sheet feeding roller 1. Thereafter, the reader CPU 301 operates a tray lifting/lowering motor 312 connected to a lifting/lowering mechanism (not illustrated) for lifting/lowering the document tray 30 to lift the document tray 30.

The lifting of the document tray 30 stops when the document tray 30 reaches a position at which the sheet feeding roller 1 that is lowered and the document placed on the document tray 30 come into contact with each other, and the document is fed into the MFP 1000 by operating a motor.

In order to realize a document reading function, the front-surface LEDs 103a and 103b, the rear-surface LEDs 203a and 203b, the front-surface line sensor 108, and the rear-surface line sensor 208 are connected to the reader CPU 301. A reader image processing unit 304 performs various types of image processing on image data read by the front-surface line sensor 108 and the rear-surface line sensor 208, and the reader CPU 301 stores the processed image data in a reader image memory 305. The reader CPU 301 transmits the stored image data to the system controller 400 via an image data bus 318 based on an image output request received from the system controller 400 via a command data bus 317. Furthermore, the reader CPU 301 transmits a notification of a vertical synchronization signal, which is used as a reference of a front edge of document image data, and a horizontal synchronization signal, which is used as a reference of a front edge of a pixel of a single line, to the system controller 400 via the image data bus 318 in synchronization with a document reading timing.

The system controller 400 includes a system central processing unit (system CPU) 411, a HDD 412, and a RAM 413 and transmits and receives data for image reading control via the command data bus 317 between the reader CPU 301 and the system controller 400. The image data processed by the reader image processing unit 304 is transferred to a system image processing unit 414 in the system controller 400 via the image data bus 318, and predetermined image processing such as color determination is performed on the transferred image data. The processed image data is stored in an image memory 415. Further, the system controller 400 includes an operation unit 416, which is also a display unit, and the system CPU 411 performs user interface control via the operation unit 416.

<Mixed Document Reading>

A method of reading documents of different sizes will be described below. As in the above-described reading methods (one-sided, two-sided reading), the reader CPU 301 singly conveys and feeds the documents placed on the document tray 30 into the conveyance path using the sheet feeding roller 1 and the separation roller 2. At this time, the length of the conveyed document is detected using the separation sensor 11. Specifically, the sheet feeding roller 1 feeds a document from the document set S on the document tray 30, and the separation roller 2 and the separation pad 21 separate the uppermost document and conveys the separated document. Then, the front edge of the conveyed document turns on the separation sensor 11. The document is then conveyed, and when the rear edge of the document passes the separation sensor 11, the separation sensor 11 is turned off. The time from when the separation sensor 11 is turned on to when the separation sensor 11 is turned off is measured, and the length of the document is measured based on the conveyance speed. This technique is a publicly-known technique that is commonly used.

Then, the document is conveyed to the front surface reading position and is read by the front surface reading unit 105. The reader image processing unit 304 detects edges of the document from the read document image and measures the width of the document from the detected edges. The document size is determined based on the measured document width and the document length measured by the above-described document length measurement method, and the read image in the determined document size is stored in the reader image memory 305.

<Document Placement Position on Tray>

A document placement position on the document tray 30 will be described below with reference to FIGS. 1A to 1D. FIGS. 1A to 1D are diagrams illustrating an example of a document placement position on the document tray 30.

The guide portions a and b for placing a document at a correct position (central position) are provided on the document tray 30 to face each other. The user can manually adjust the guide portions a and b based on the document width in the direction perpendicular to the document conveyance direction to manually adjust the width of a document placeable on the document tray 30. If one of the guide portions a and b is moved, the other one of the guide portions a and b is correspondingly moved by the same distance. For example, if one of the guide portions a and b is moved in a direction to reduce the width between the guide portions a and b, the other one of the guide portions a and b is moved in a direction to reduce the width by the same distance. This enables placement of a document at a substantially central position where the sheet feeding roller 1 is positioned.

Reducing the width between the guide portions a and b to the width of the document placed on the document tray 30 prevents skew conveyance of the document by the sheet feeding roller 1. Further, the guide portions a and b are used to determine a reading size in a case where documents of one size are placed on the document tray 30 and are to be read. Specifically, the reading size is determined based on the width between the guide portions a and b and information detected by the length-on-tray sensor 9 on the document tray 30.

Figure 1A:
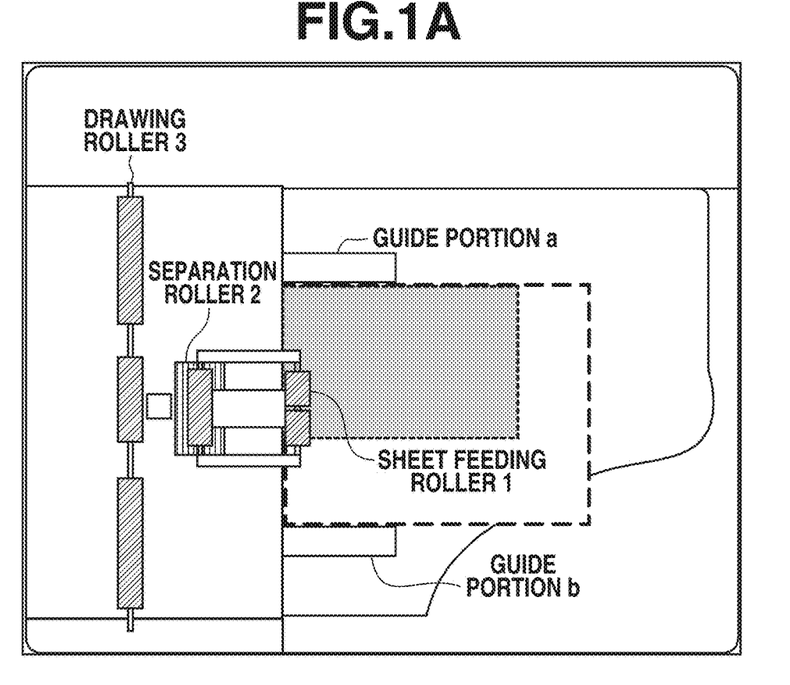
FIGS. 1A to 1D are diagrams illustrating an example of a document placement position on a document tray.

In a case of mixed documents, a plurality of different documents is placed on the document tray 30. Thus, as illustrated in FIG. 1A, documents that are smaller in size than the largest-size document are placed by abutting the documents against the guide portion a. This prevents skew conveyance of the documents illustrated in FIG. 1D during document conveyance by the sheet feeding roller 1. The skew conveyance is prevented because the document is held by the guide portion a, even if the sheet feeding roller 1 pulls the left edge of the document and an oblique torque is applied to the document.

In a case where mixed documents are placed and the documents of smaller sizes than the largest-size document are placed by abutting the documents against the guide portion a and the documents of smaller sizes are standard-size documents, the documents reach the sheet feeding roller 1.

The standard size is a size that is pre-registered in the MFP 1000. Further, the standard size may be a size defined by a standard such as International Organization for Standardization (ISO) 216. Further, the standard size may be either of them.

Figure 1B:
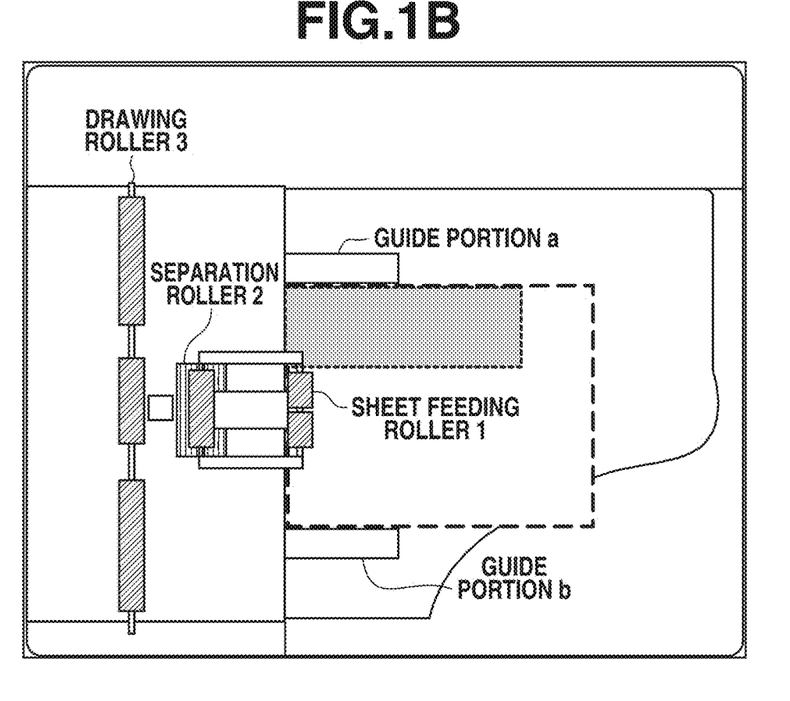

However, in a case where an edge portion of a document in the direction perpendicular to the document conveyance direction is abutted against the guide portion a as illustrated in FIG. 1B, the edge portion of the placed document that is opposite to the abutted edge portion may fail to reach the sheet feeding roller 1. Examples of nonstandard-size documents include a proof of purchase such as a receipt, a check, and a slip. The nonstandard-size herein is a size that is not registered in the MFP 1000. Further, the nonstandard-size may be a size that is not defined by a standard such as ISO 216. Further, the nonstandard-size may be neither of them.

Figure 1C:
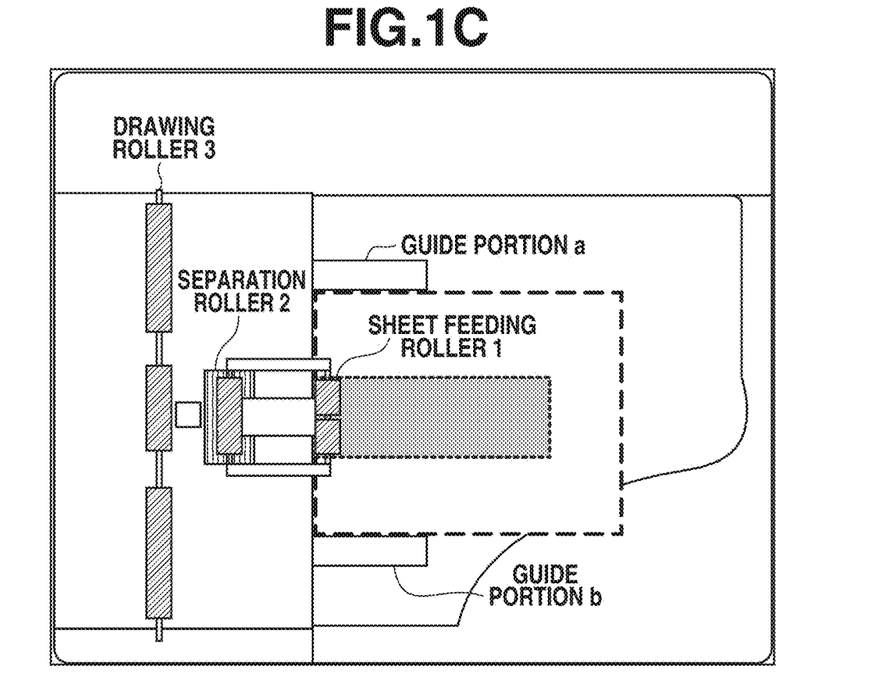
Figure 1D:
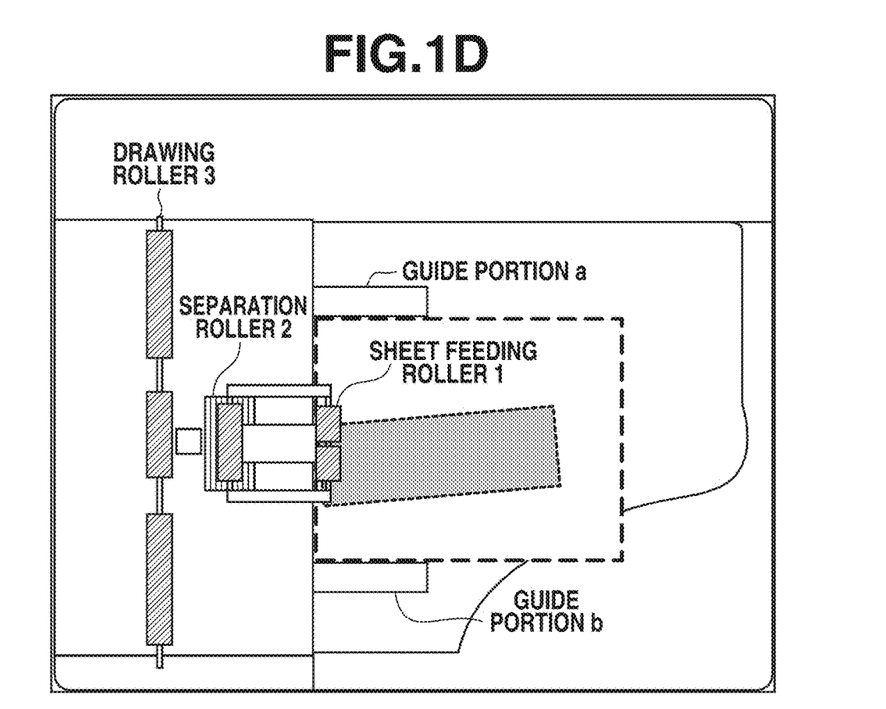

In this case, even if a read instruction is issued, the uppermost document that is not in contact with the sheet feeding roller 1 is not conveyed whereas a document that is in contact with the sheet feeding roller 1 is conveyed. Therefore, there is an issue that a document placed by abutting the document against the guide portion a may fail to reach the sheet feeding roller 1 and therefore may not be conveyed depending on the size of the document. To overcome this issue, the documents need to be placed as illustrated in FIG. 1C so that the sheet feeding roller 1 can convey the documents. The following process is performed to prompt the user to place the documents as described above.

<Reading of Mixed Nonstandard-Size Documents>

Figure 6:
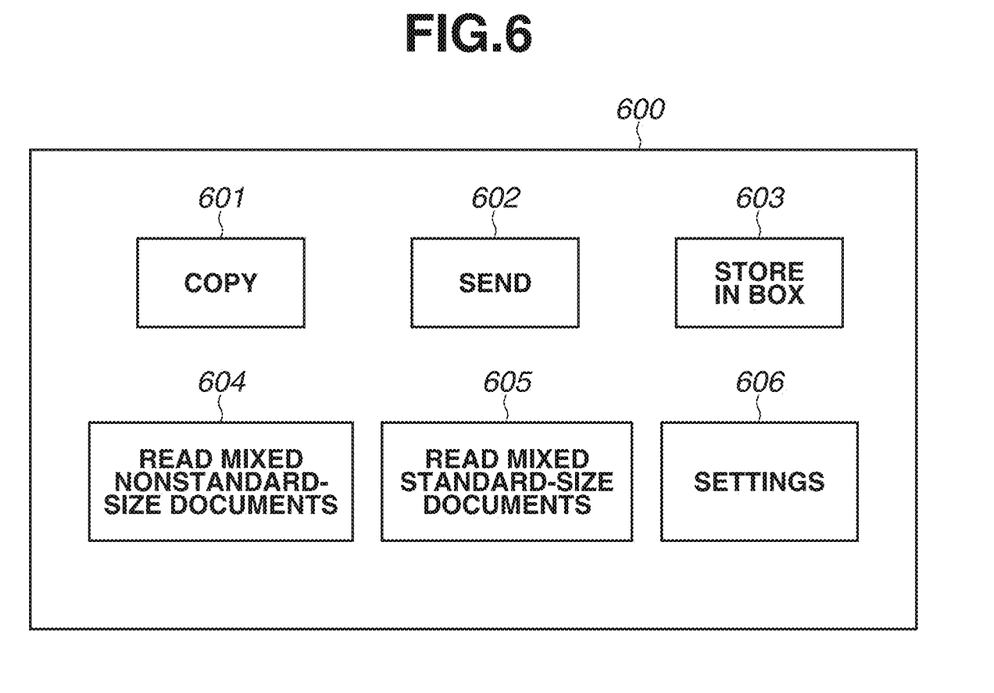
FIG. 6 is a diagram illustrating an example of a home screen 600.

The reading of mixed nonstandard-size documents according to the present exemplary embodiment will be described below with reference to the drawings. FIG. 6 is a diagram illustrating an example of a home screen 600. The home screen 600 illustrated in FIG. 6 is a screen that is displayed on the operation unit 416 when a reading operation is not performed after the power is turned on. Buttons 601 to 606 illustrated in FIG. 6 are selectable by touching a touch panel of the operation unit 416.

In a case where the user desires to read mixed nonstandard-size documents, the user selects the button 604 to enable reading of mixed nonstandard-size documents.

Figure 7A:
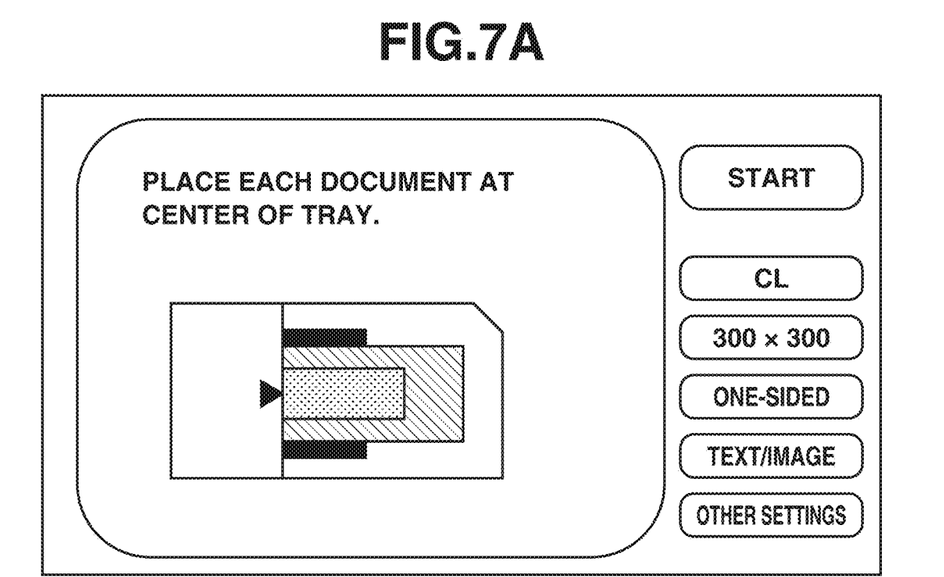
FIGS. 7A and 7B are diagrams illustrating an example of an information notification screen.

At the selection of the button 604, a screen illustrated in FIG. 7A is displayed, and the screen displays information that prompts the user to place documents at the center of the document tray 30. Further, the user can select desired detailed reading settings. The center of the document tray 30 herein is the center of the document tray 30 in the direction perpendicular to the document conveyance direction.

Figure 7B:
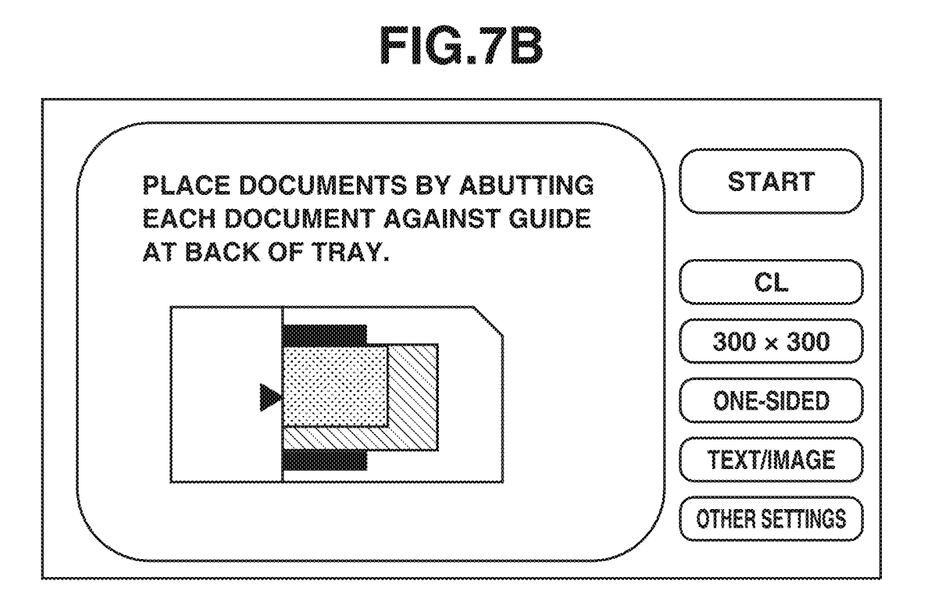

FIGS. 7A and 7B are diagrams illustrating an example of an information notification screen. In a case where the user desires to read mixed standard-size documents, the user selects the button 605 to enable reading of mixed standard-size documents.

At the selection of the button 605, a screen illustrated in FIG. 7B is displayed, and the screen displays information that prompts the user to place documents by abutting each document against the guide portion a at the back of the document tray 30. Further, the user can select desired detailed reading settings.

While the example in which the screen illustrated in FIG. 7A is displayed at the selection of the button 604 and the screen illustrated in FIG. 7B is displayed at the selection of the button 605 is described in the present exemplary embodiment, the present exemplary embodiment is not limited to the example.

For example, the button 601 for displaying a screen for setting a copy function of the MFP 1000 is selected to display a reading setting screen. The information notification screen may be displayed at the issuance of an instruction to execute copying in a state where a mode of reading nonstandard-size documents and a mode of reading mixed documents (mixed document mode) are set on the reading setting screen. Alternatively, the information notification screen may be displayed at the issuance of an instruction to execute scanning. In this case, a setting button on the screen illustrated in FIG. 7A is not displayed.

Further, the reading setting screen is displayed at the selection of the button 602 for displaying a screen for setting a function of the MFP 1000 that is a function of transmitting image data generated by reading a document. The information notification screen may be displayed at the issuance of an instruction to execute transmission in a state where the mode of reading nonstandard-size documents and the mode of reading mixed documents are set on the reading setting screen. Alternatively, the information notification screen can be displayed at the issuance of an instruction to execute scanning. In this case, the setting button on the screen illustrated in FIG. 7A is not displayed.

The button 603 illustrated in FIG. 6 is a button for displaying a screen for setting the function of reading a document and storing generated image data in the HDD 412 of the MFP 1000.

The button 606 is a button for displaying a screen for setting various settings of the MFP 1000.

<Display Control of Document Placement Method Based on Mixed Document Mode>

Figure 8:
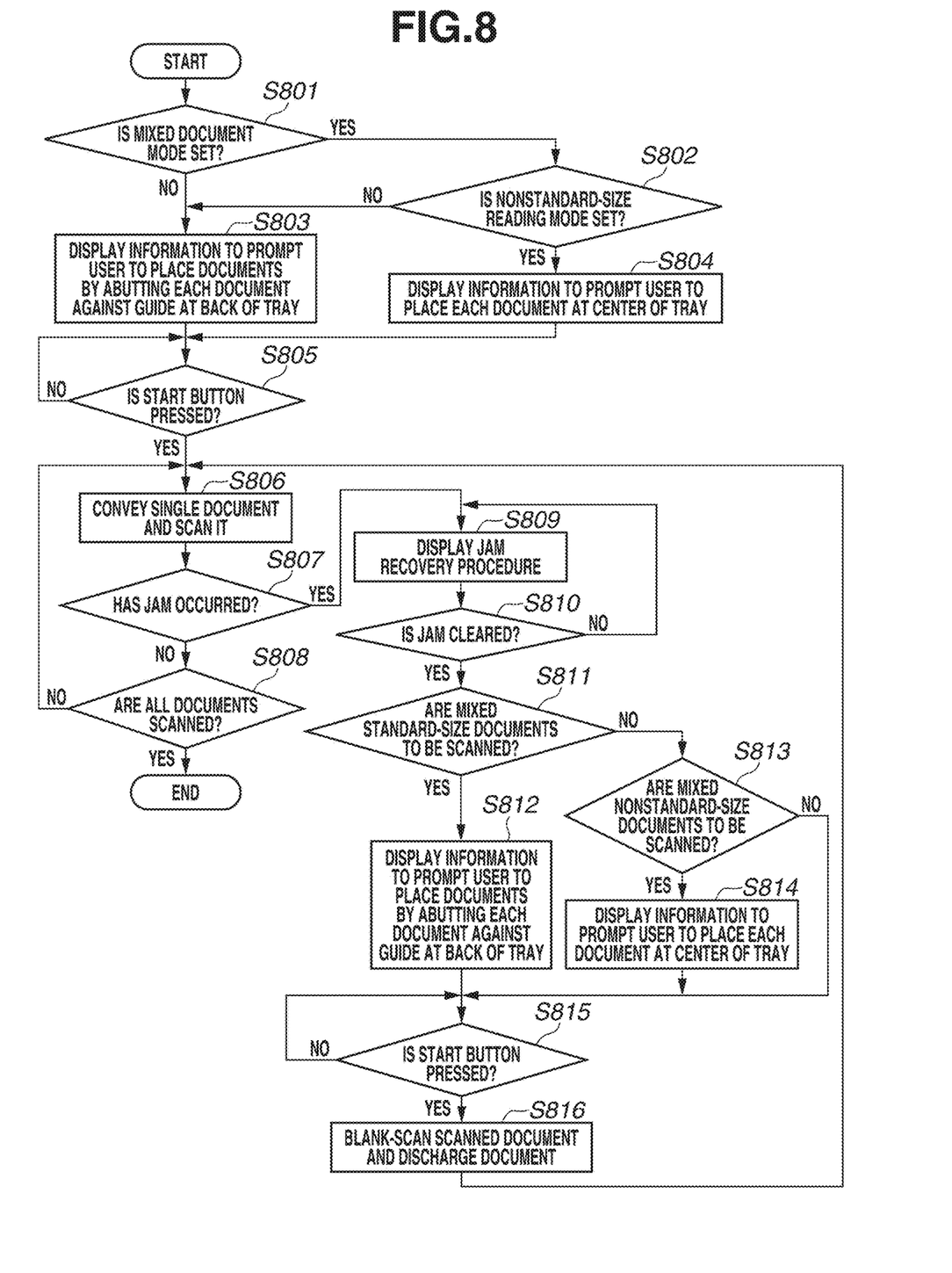
FIG. 8 is a flowchart illustrating an example of a process of displaying a screen during execution of reading by a document reading apparatus.

The display control of a document placement method based on the mixed document mode according to the present exemplary embodiment will be described below with reference to a flowchart illustrated in FIG. 8. FIG. 8 is a flowchart illustrating an example of a screen display process during execution of reading by the MFP 1000.

The system CPU 411 executes a program read from a ROM 417 and loaded onto the RAM 413 to perform the process illustrated in FIG. 8. The process illustrated in FIG. 8 is started when the MFP 1000 is turned on.

In step S801, the system CPU 411 determines whether the mixed document mode is set. Specifically, the system CPU 411 determines whether there is a possibility of reading a plurality of documents of different sizes. Specifically, the system CPU 411 determines whether the button 604 or 605 is selected on the home screen 600. Alternatively, the system CPU 411 determines whether the mixed document mode is set on the reading setting screen displayed after the button 601 or 602 is selected. In a case where the system CPU 411 determines that the mixed document mode is set (YES in step S801), the processing proceeds to step S802. Otherwise (NO in step S801), the processing proceeds to step S803.

The mixed document mode herein is a mode of reading a plurality of documents of different sizes in a single job.

In step S802, the system CPU 411 determines whether a nonstandard-size reading mode is set. Specifically, the system CPU 411 determines whether the button 604 on the home screen 600 is selected. Alternatively, the system CPU 411 determines whether the nonstandard-size reading mode is set on the reading setting screen displayed after the button 601 or 602 is selected.

In a case where the system CPU 411 determines that the nonstandard-size reading mode is set (YES in step S802), the processing proceeds to step S804. Otherwise (NO in step S802), the processing proceeds to step S803.

In step S803, the system CPU 411 displays information that prompts the user to place a plurality of documents by abutting each document against one guide portion (at the back) of the document tray 30 on the operation unit 416 as illustrated in FIG. 7B. In the case where the system CPU 411 determines that a document of a size that is not likely to reach the sheet feeding roller 1 when abutted against the guide portion a and is thus not likely to be conveyed, such as a nonstandard-size document, is not to be placed as described above, skew conveyance of the documents is prevented.

In step S804, the system CPU 411 displays information that prompts the user to place each of a plurality of documents at the center of the document tray 30 on the operation unit 416 as illustrated in FIG. 7A. In a case where the system CPU 411 determines that a document of a size that is not likely to reach the sheet feeding roller 1 when abutted against the guide portion a and is thus not likely to be conveyed, such as a nonstandard-size document, is to be placed as described above, a failure to convey a document is prevented.

The prompting information in FIGS. 7A and 7B may be information that prompts the user to place a document having a width less than the width between the guide portions a and b at the center or by abutting the document against the guide portion a.

While the example in which the screen illustrated in FIG. 7A is displayed on the basis that the mixed document mode is set and the mode of reading nonstandard-size documents is set is described in the present exemplary embodiment, the present exemplary embodiment is not limited to the example. For example, even if the mode of reading non-standard-size documents is not set, the screen illustrated in FIG. 7A may be displayed on the basis that the mixed document mode is set. This prevents a failure to convey a nonstandard-size document even in a case where the mode of reading nonstandard-size documents is not set although the user is to place a nonstandard-size document on the document tray 30.

In step S805, the system CPU 411 determines whether a start button is selected. Specifically, in a case where the button 604 or 605 on the home screen 600 is selected, the system CPU 411 determines whether the start button displayed on the screen illustrated in FIG. 7A or on the screen illustrated in FIG. 7B is selected. Alternatively, in a case where the button 601 or 602 on the home screen 600 is selected and the mode is set on the reading setting screen, the system CPU 411 determines whether the start button displayed on the reading setting screen is selected. In a case where the start button is selected (YES in step S805), the processing proceeds to step S806. Otherwise (NO in step S805), the processing returns to step S805.

In step S806, the system CPU 411 controls the reader CPU 301, and the reader CPU 301 controls the ADF 200 to convey a single document placed on the document tray 30, to read the document, and to generate image data. At this time, in a case where a button such as the button 601 or 602 is selected to issue a read instruction, a process corresponding to a function of the button is started as another process. For example, in a case where the button 601 is selected, a process of printing an image on a sheet is started based on the generated image data. Further, in a case where the button 602 is selected, a process of transmitting the generated image data to a set destination is started.

In step S807, the system CPU 411 controls the reader CPU 301 and determines whether a jam has occurred in the ADF 200. In a case where the system CPU 411 determines that a jam has occurred (YES in step S807), the processing proceeds to step S809. Otherwise (NO in step S807), the processing proceeds to step S808.

In step S808, the system CPU 411 controls the reader CPU 301 and determines whether a document is placed on the document tray 30 to determine whether all documents are scanned. In a case where the system CPU 411 determines that all documents are scanned (YES in step S808), the process ends. Otherwise (NO in step S808), the processing returns to step S806.

In step S809, the system CPU 411 displays a jam recovery procedure on the operation unit 416. After step S809, the processing proceeds to step S810, and the system CPU 411 waits until the jam is cleared. In step S810, in a case where the system CPU 411 is notified by the reader CPU 301 that the jam is cleared (YES in step S810), the processing proceeds to step S811, and the system CPU 411 determines whether mixed standard-size documents are to be scanned. In step S811, in a case where the system CPU 411 determines that mixed standard-size documents are to be scanned (YES in step S811), the processing proceeds to step S812, and the system CPU 411 displays information that prompts the user to place documents by abutting each document against the guide portion a at the back of the document tray 30 on the operation unit 416. On the other hand, in step S811, in a case where the system CPU 411 determines that mixed standard-size documents are not to be scanned (NO in step S811), the processing proceeds to step S813, and the system CPU 411 determines whether nonstandard mixed documents are to be scanned. In step S813, in a case where the system CPU 411 determines that nonstandard mixed documents are to be scanned (YES in step S813), the processing proceeds to step S814, and the system CPU 411 displays information that prompts the user to place each document at the center of the document tray 30 on the operation unit 416. On the other hand, in step S813, in a case where the system CPU 411 determines that nonstandard mixed documents are not to be scanned (NO in step S813), the processing proceeds to step S815 following steps S812 and S814, and the system CPU 411 waits until the start button is pressed. In step S815, in a case where the system CPU 411 determines that the start button is pressed (YES in step S815), the processing proceeds to step S816, and the system CPU 411 notifies the reader CPU 301 of the recovery from the jam and performs blank-scanning of the scanned document and discharges the document. After step S816, the processing returns to step S806, and the reader CPU 301 re-starts document scanning.

The above-described process enables the user to recognize how a document should be placed based on the selected mixed document mode before a scan of mixed documents is started or when a document is placed again after a jam by checking the display on the operation unit 416. This prevents an issue that a document is not fed, a jam occurs, or an image is cut due to an incorrect document placement method.

While the example in which the information that prompts the user to place documents at the center of the document tray 30 in the direction perpendicular to the document conveyance direction is displayed is described in the present exemplary embodiment, the present exemplary embodiment is not limited to the example. For example, information that prompts the user to place documents at a position corresponding to the position of the sheet feeding roller 1 may be displayed.

Other Exemplary Embodiments

The present disclosure is also realized by a process in which a program for realizing one or more functions of the above-described exemplary embodiments is fed to a system or an apparatus via a network or a storage medium and one or more processors of a computer of the system or the apparatus reads the program and executes the read program. Further, the present disclosure is also realized by a circuit (e.g., application-specific integrated circuit (ASIC)) that realizes one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-123123, filed Jul. 17, 2020, which is hereby incorporated by reference herein in its entirety.

What is claimed is:

1. A scanning apparatus comprising:
a display;
a document placing portion;
a conveyer that conveys a document placed on the document placing portion; a scanner that scans the document conveyed by the conveyer and generates image data; and
a controller,
wherein, based on at least a scanning mode that is for scanning a set including a plurality of documents of a plurality of sizes and that is set on the scanning apparatus, the controller causes the display to display information that prompts a user to place the plurality of documents at a center of the document placing portion in a direction perpendicular to a document conveyance direction in which the conveyer conveys the plurality of documents.

2. The scanning apparatus according to claim 1, further comprising a guide portion that adjusts, based on a width of a document to be placed on the document placing portion, in the direction perpendicular to the document conveyance direction,
wherein, based on a mode set on the scanning apparatus, the controller determines whether to cause the display to display the information that prompts the user to place the plurality of documents at the center of the document placing portion or to cause the display to display information that prompts the user to place the plurality of documents by abutting, against the guide portion, an edge of each document in the direction perpendicular to the document conveyance direction.

3. The scanning apparatus according to claim 1, wherein the information includes a message that prompts the user to place the plurality of documents at the center of the document placing portion.

4. The scanning apparatus according to claim 1, wherein, based on that the scanning mode is set on the scanning apparatus and that a mode of scanning a document of a size that is not registered in the scanning apparatus is set on the scanning apparatus, the controller cause the display to display the information.

5. The scanning apparatus according to claim 4,
wherein the conveyer includes a roller configured to be brought into contact with the document being placed on the document placing portion and to convey the document, and
wherein the document of the size that is not registered in the scanning apparatus includes a document having an edge portion that does not reach the roller in a case where the document is placed on the document placing portion by abutting another edge portion of the document against a guide portion.

6. The scanning apparatus according to claim 1,
wherein the conveyer includes a roller configured to be brought into contact with the document being placed on the document placing portion and to convey the document, and
wherein the roller is substantially positioned at the center of the document placing portion in the direction perpendicular to the document conveyance direction in which the conveyer conveys the plurality of documents.

7. A method of controlling a scanning apparatus having a display, a document placing portion, and a conveyer, the method comprising:

conveying a document placed on the document placing portion using the conveyer;

scanning the document conveyed by the conveyer and generating image data; and causing, based on at least a scanning mode that is for scanning a set including a plurality of documents of a plurality of sizes and that is set on the scanning apparatus, the display to display information that prompts a user to place the plurality of documents at a center of the document placing portion in a direction perpendicular to a document conveyance direction in which the conveyer conveys the plurality of documents.

8. A non-transitory computer-readable storage medium storing a program to cause a computer to perform a method of controlling a scanning apparatus having a display, a document placing portion, and a conveyer, the method comprising:

conveying a document placed on the document placing portion using the conveyer;

scanning the document conveyed by the conveyer and generating image data; and causing, based on at least a scanning mode that is for scanning a set including a plurality of documents of a plurality of sizes and that is set on the scanning apparatus, the display to display information that prompts a user to place the plurality of documents at a center of the document placing portion in a direction perpendicular to a document conveyance direction in which the conveyer conveys the plurality of documents.

* * * * *